United States Patent
Ge et al.

(10) Patent No.: US 12,397,866 B2
(45) Date of Patent: Aug. 26, 2025

(54) ROBOT STEP CONTROL METHOD, ROBOT CONTROL APPARATUS, AND COMPUTER READABLE STORAGE MEDIUM

(71) Applicant: UBTECH ROBOTICS CORP LTD, Shenzhen (CN)

(72) Inventors: Ligang Ge, Shenzhen (CN); Yizhang Liu, Shenzhen (CN); Qiuyue Luo, Shenzhen (CN); Chunyu Chen, Shenzhen (CN); Xuan Luo, Shenzhen (CN); Jiangchen Zhou, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 379 days.

(21) Appl. No.: 18/091,327

(22) Filed: Dec. 29, 2022

(65) Prior Publication Data

US 2023/0234655 A1    Jul. 27, 2023

(30) Foreign Application Priority Data

Jan. 21, 2022    (CN) .......................... 202210074131.9

(51) Int. Cl.
  *B25J 9/16*     (2006.01)
  *B25J 17/00*    (2006.01)
  (Continued)

(52) U.S. Cl.
  CPC ............ *B62D 57/032* (2013.01); *B25J 17/00* (2013.01); *G05D 1/0212* (2013.01)

(58) Field of Classification Search
  CPC ..... B62D 57/032; B25J 17/00; G05D 1/0212; G05D 1/0891
  See application file for complete search history.

(56) References Cited

U.S. PATENT DOCUMENTS 7,603,234 B2 * 10/2009 Takenaka ............. B62D 57/032
                                                  700/250
9,878,751 B1 *  1/2018 Thorne ................ B62D 57/032
                     (Continued)

FOREIGN PATENT DOCUMENTS

CN           108237532 A       7/2018

OTHER PUBLICATIONS

Contact Force/Torque Control Based on Viscoelastic Model for Stable Bipedal Walking on Indefinite Uneven Terrain Oct. 4, 2019 (Year: 2019).*

*Primary Examiner* — Masud Ahmed

(57) ABSTRACT

A robot step control method, a robot control apparatus, and a storage medium are provided. The method includes: determining an expected support force of two legs of a biped robot according to zero-moment point planning data and actual position data of the two legs at a current moment, and determining a current desired joint posture angle of ankle joints of the two legs and a desired joint position matching an actual leg support state using a compliance control algorithm based on an expected support force of the two legs, and centroid movement planning data, centroid actual movement data, step planning data and actual force data of the two legs at the current moment. In such manner, all-direction compliant controls can be performed on a desired leg pose condition according to the actual motion status of the biped robot, thereby improving the walking stability and terrain adaptability of the biped robot.

20 Claims, 10 Drawing Sheets

(51) Int. Cl.
*B62D 57/032* (2006.01)
*G05D 1/00* (2006.01)

(56) References Cited

U.S. PATENT DOCUMENTS

| | | | |
|---|---|---|---|
| 2005/0115747 A1* | 6/2005 | Takenaka | B62D 57/02 |
| | | | 180/8.1 |
| 2011/0301756 A1* | 12/2011 | Yoshiike | B62D 57/032 |
| | | | 901/1 |
| 2021/0009218 A1* | 1/2021 | Huang | B62D 57/02 |
| 2022/0203521 A1* | 6/2022 | Ge | B25J 9/1602 |
| 2022/0203522 A1* | 6/2022 | Ge | B25J 9/1633 |

* cited by examiner

Calculate a gravity sharing coefficient of each of the two legs of the biped robot based on a zero-moment point lateral planning position included in the zero-moment point planning data and an actual lateral position of each of the two legs of the biped robot included in the actual position data of the two legs — S221

Calculate the expected support force of the two legs based on a mass of the biped robot and the gravity sharing coefficient of each of the two legs of the biped robot. — S222

FIG. 5

ROBOT STEP CONTROL METHOD, ROBOT CONTROL APPARATUS, AND COMPUTER READABLE STORAGE MEDIUM

CROSS REFERENCE TO REFLATED APPLICATIONS

The present disclosure claims priority to Chinese Patent Application No. 202210074131.9, filed Jan. 21, 2022, which is hereby incorporated by reference herein as if set forth in its entirety.

BACKGROUND

1. Technical Field

The present disclosure relates to robot control technology, and particularly to a robot step control method, a robot control apparatus, and a storage medium.

2. Description of Related Art

With the continuous development of technologies, robot technologies have received extensive attention from all walks of life because of its great values in researches and applications. Among them, the control methods for biped robots is an important research direction in the control methods for robots.

However, during the walking control of a biped robot, due to factors such as the simplification of gait planning model, the deformation of mechanical structures, and uneven ground, the un-matchingness between the leg pose condition of the biped robot when stepping according to the planned walking trajectory and the actual ground conditions will usually be caused, which results in the serious collisions with the ground by the landing of the biped robot during the single-leg support period and the generation of the larger inter-leg internal force of the biped robot during the two-leg support period, and the walking stability of the biped robot will be affected seriously.

BRIEF DESCRIPTION OF THE DRAWINGS

To describe the technical schemes in the embodiments of the present disclosure or in the prior art more clearly, the following briefly introduces the drawings required for describing the embodiments or the prior art. It should be understood that, the drawings in the following description merely show some embodiments. For those skilled in the art, other drawings can be obtained according to the drawings without creative efforts.

FIG. 5 is a flow chart of sub-steps included in step S220 of FIG. 4.

DETAILED DESCRIPTION

Figure 1:
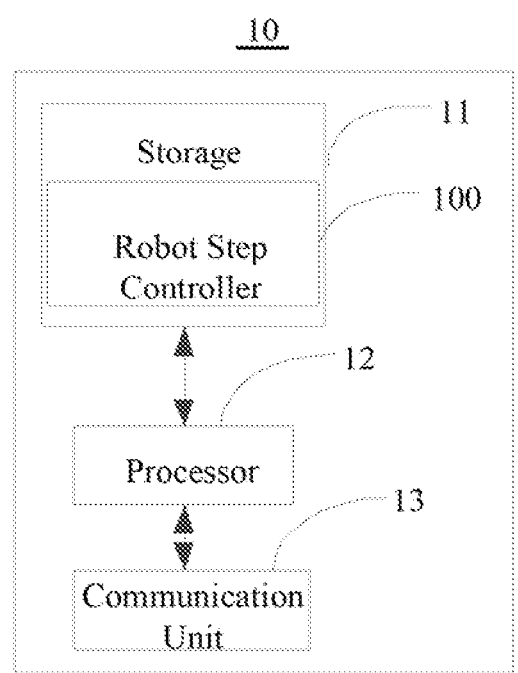
FIG. 1 is a schematic block diagram of the structure of a robot control apparatus according to an embodiment of the present disclosure.

In order to make the objects, technical solutions and advantages of the embodiments of the present disclosure more clear, the technical solutions in the embodiments of the present disclosure will be clearly and completely described below with reference to the drawings in the embodiments of the present disclosure. Apparently, the described embodiments are part of the embodiments of the present disclosure, not all of the embodiments. The components of the embodiments of the present disclosure that are described and illustrated in the drawings herein may generally be arranged and designed in a variety of different configurations.

Therefore, the following detailed description of the embodiments of the present disclosure provided in the drawings is not intended to limit the scope of the present disclosure, but merely represent the selected embodiments of the present disclosure. Based on the embodiments in the present disclosure, all other embodiments obtained by those of ordinary skill in the art without creative work fall within the protection scope of the present disclosure.

It should be noted that, in the following figures, similar numerals and letters refer to similar items. Therefore, once an item is defined in one figure, it does not require further definition and explanation in subsequent figures.

In the description of the present disclosure, it is to be understood that the orientational or positional relationship indicated by the terms "center", "upper", "lower", "left", "right", "vertical", "horizontal", "inner", "outer", or the like is based on the orientational or positional relationship shown in the drawings, that in the usual placement of the product related to the present disclosure, or that commonly understood by those skilled in the art, and is merely for the convenience of describing the present disclosure and simplifying the description, rather than indicating or implying that the device or component referred to must have a particular orientation, be constructed and operated in a particular orientation, hence should not be understood as limitations to the present disclosure.

In the descriptions of the embodiments of the present disclosure, it should be understood that, relational terms such as "first" and "second" are used only to distinguish one entity or operation from another entity or operation, and do not necessarily require or imply the existence of any actual relationship or sequence between these entities or operations. Moreover, the terms "comprising", "including" or any other variation thereof are intended to encompass non-exclusive inclusion such that a process, method, article or apparatus (device) comprising a series of elements includes not only those elements, but also includes other elements not explicitly listed or inherent to the process, method, article or apparatus. Without further limitation, an element limited by the sentence "comprising a . . . " does not preclude the existence of additional identical elements in a process, method, article or apparatus that includes the element. For those of ordinary skill in the art, the specific meanings of the above-mentioned terms in the present disclosure can be understood according to the specific condition.

Some embodiments of the present disclosure will be described in detail below with reference to the drawings. The following embodiments and the features therein may be combined with each other while there is no confliction therebetween.

FIG. 1 is a schematic block diagram of the structure of a robot control apparatus according to an embodiment of the present disclosure. As shown in FIG. 1, in this embodiment, a robot control apparatus 10 for a biped robot having two legs is provided. In this embodiment, the robot control apparatus 10 may be configured to control the motion status of the biped robot, so that a desired leg pose condition (including a desired leg position and a desired leg posture) of the biped robot that is desired to represent during moving according to a pre-planned walking trajectory is substantially matched with the actual ground conditions, so as to reduce the impact force of the foot landing in single-leg support period of the biped robot, and the inter-leg internal force in two-leg support period of the biped robot, thereby effectively improving the walking stability and terrain adaptability of the biped robot. In which, the robot control apparatus 10 may be remotely connected with the biped robot, or may be integrated with the biped robot, so as to realize the motion control of the biped robot.

In this embodiment, the robot control apparatus 10 may include a storage 11, a processor 12, a communication unit 13, and a robot step controller 100. The components of the storage 11, the processor 12 and the communication unit 13 are directly or indirectly electrically connected to each other to realize data transmission or interaction. For example, the components of the storage 11, the processor 12 and the communication unit 13 may be electrically connected to each other through one or more communication buses or signal lines.

In this embodiment, the storage 11 may be, but not limited to, a random access memory (RAM), a read only memory (ROM), a programmable read only memory (PROM), erasable programmable read-Only memory (EPROM), electrical erasable programmable read-only memory (EEPROM), or the like. In which, the storage 11 is used for storing computer programs, and the processor 12 can execute the computer programs correspondingly after receiving execution instructions.

In this embodiment, the processor 12 may be an integrated circuit chip with signal processing capability. The processor 12 may be a general purpose processor including at least one of a central processing unit (CPU), a graphics processing unit (GPU), a network processor (NP), a digital signal processor (DSP), an application specific integrated circuit (ASIC), a field-programmable gate array (FPGA) or other programmable logic devices, discrete gate, transistor logic device, and discrete hardware component. The general purpose processor may be a microprocessor or the processor may also be any conventional processor that may implement or execute the methods, steps, and the logical block diagrams disclosed in the embodiments of the present disclosure.

In this embodiment, the communication unit 13 is used for establishing a communication connection between the robot controller 10 and other electronic devices through a network, and for sending/receiving data through the network, where the network includes a wired communication and a wireless communication network. For example, the robot control apparatus 10 may obtain a planned walking trajectory for the biped robot from a walking planning apparatus through the communication unit 13, and send motion control instructions to the biped robot through the communication unit 13, so that the biped robot moves according to the motion control instructions.

In this embodiment, the robot step controller 100 may include at least one software function module that can be stored in the storage 11 or solidified in the operating system of the robot control apparatus 10 in the form of software or firmware. The processor 12 may be used to execute executable modules such as software function modules and computer programs included in the robot step controller 100 that are stored in the storage 11. The robot control apparatus 10 cab perform all-direction compliant controls on the desired leg pose condition of the biped robot through the robot step controller 100 at leg position dimension level and leg posture dimension level according to the actual motion status of the biped robot, so that both the desired leg position and desired leg posture of the biped robot can substantially match the actual ground conditions. In such a manner, when the biped robot is moved according to the desired leg pose condition, the impact force of the foot landing in a single-leg support period (the time period when the biped robot maintains a single-leg support state) of the biped robot, and the inter-leg internal force in a two-leg support period (the time period when the biped robot maintains a two-leg support state) of the biped robot can be effectively reduced, thereby improving the walking stability and the terrain adaptability of the biped robot.

It can be understood that the composition of the robot control apparatus 10 in FIG. 1 is only an example of that of a robot control apparatus, and the robot control apparatus 10 may further include more or less elements than those shown in FIG. 1, or have a different configuration from that shown in FIG. 1. Each of the elements shown in FIG. 1 may be implemented in hardware, software, or a combination thereof.

Figure 2:
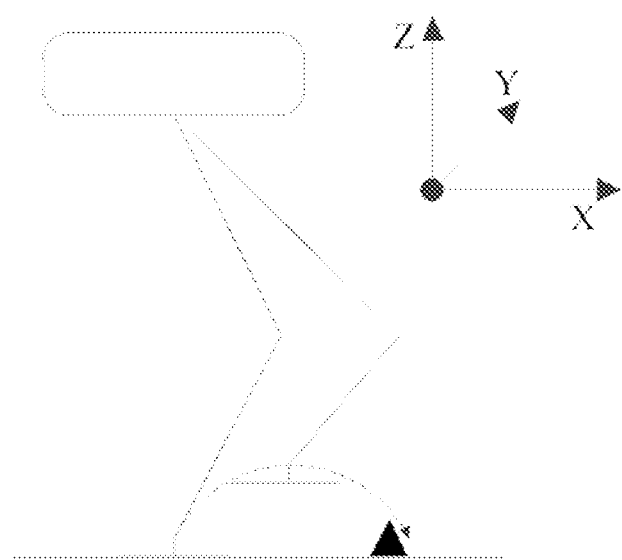
FIG. 2 is a schematic diagram of the walking of a biped robot according to an embodiment of the present disclosure.

FIG. 2 is a schematic diagram of the walking of a biped robot according to an embodiment of the present disclosure. As shown in FIG. 2, in this embodiment, in the whole walking process of the biped robot, there are a two-leg support state and a single-leg support state. When the biped robot is in the two-leg support state, both of the two legs of the biped robot are supporting on the ground to ensure that the biped robot remains standing; otherwise, when the biped robot is in the single-leg support state, one of the legs of the biped robot will be used as the support leg to support the biped robot to maintain standing, while the other of the legs of the biped robot will be used as the swing leg that needs to change the motion track. The foot on the support leg is the support foot currently in contact with the ground, and motion track changes of the swing leg includes raising of the swing leg, hanging of the swing leg, and landing of the swing leg. Therefore, for one step of the biped robot, the corresponding gait cycle will be composed of one two-leg support period and one single-leg support period that connect with each other. The single-leg support period will also consist of a swing leg lifting period, a swing leg hanging period, and a swing leg landing period.

At this time, the contact position of the sole of a raised leg of the biped robot after landing may be correspondingly selected as the origin of the world coordinate system to establish a Cartesian right-handed coordinate system. The positive direction of the X axis represents the forward direction of the biped robot and the positive direction of the Z axis is vertical to the ground in the upward direction, and the height of the specific part (e.g., a certain ankle joint of leg) of the biped robot relative to the ground is described through the Z axis. The positive direction of the Y axis represents the side motion direction of the biped robot.

Thus, the pose distribution (including position distribution and posture distribution) of each component in the biped robot in the entire world coordinate system may be represented through the Cartesian right-handed coordinate system, so that the robot control apparatus 10 controls the biped robot to move its components to desired positions and present desired postures based on the Cartesian right-handed coordinate system.

Figure 3:
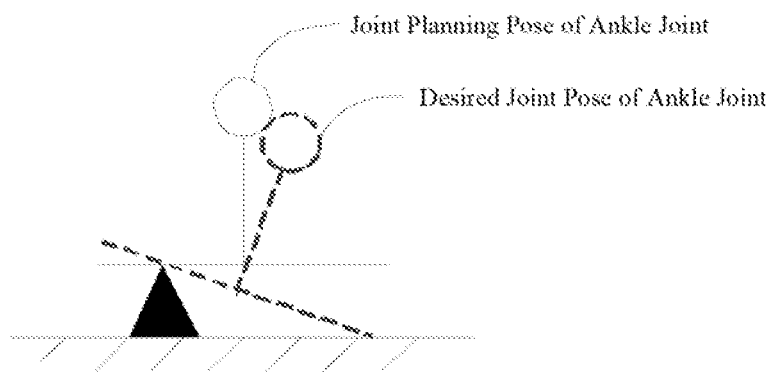
FIG. 3 is a schematic diagram of the pose adjustment of an ankle joint of the biped robot of FIG. 2.

FIG. 3 is a schematic diagram of the pose adjustment of an ankle joint of the biped robot of FIG. 2. As shown in FIG. 3, when there is an obstacle (the triangle in FIG. 3 that is filled with black) at the landing position of the lifted leg of the biped robot, if the ankle joint of the lifted leg is moved to the obstacle according to the planned walking trajectory and represents a corresponding joint planning pose (see the position of the ankle joint and the posture of the sole that are represented by the solid line in FIG. 3), it can be clearly seen that this leg cannot ensure the walking balance of the biped robot, and it is necessary to adjust the joint planning pose of the ankle joint of the leg of the biped robot so as to obtain the desired joint pose (see the position of the ankle joint and the posture of the sole that are represented by the dotted line in FIG. 3) of the ankle joint, thereby ensuring that the biped robot stepping on the obstacle to maintain the walking balance, so as to reduce the landing impact force corresponding to the leg and the internal force between the two legs when the leg as the support leg to cooperate with the other leg.

In the present disclosure, in order to ensure that the robot control apparatus 10 can perform all-direction compliant control on the desired leg pose condition of the biped robot according to the actual motion status of the biped robot during the walking of the biped robot, it makes both of the desired leg position and the desired leg posture of the biped robot to substantially match the actual ground conditions, so as to effectively reduce the impact force of the foot landing during the single-leg support period of the biped robot and the inter-leg internal force of the biped robot during the two-leg support period through the desired leg pose condition, thereby improving the walking stability and terrain adaptability of the biped robot.

Figure 4:
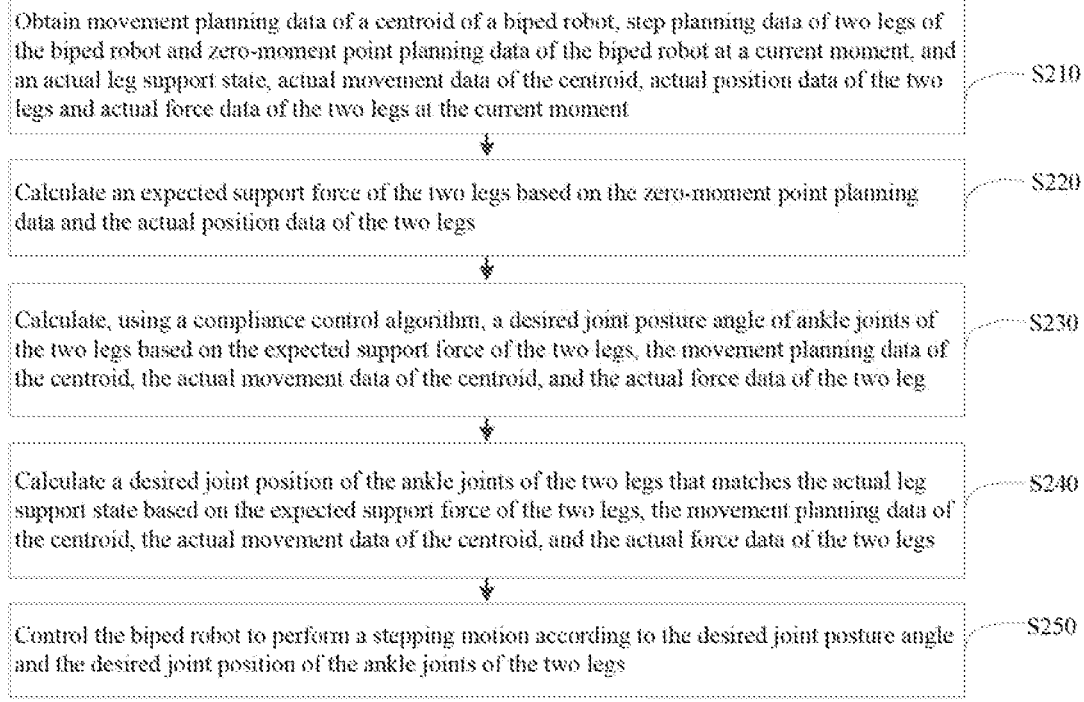
FIG. 4 is a flow chart of a robot step control method according to an embodiment of the present disclosure.

FIG. 4 is a flow chart of a robot step control method according to an embodiment of the present disclosure. In this embodiment, the robot step control method is a computer-implemented method executable for a processor of a biped robot (e.g., a humanoid robot). In other embodiments, the method may be implemented through the robot step control apparatus 10 shown in FIG. 1 or a robot step controller 100 shown in FIG. 10. As shown in FIG. 4, in this embodiment, the robot step control method may include the following steps.

S210: obtaining movement planning data of a centroid of the biped robot, step planning data of two legs of the biped robot and zero-moment point planning data of the biped robot at a current moment, and an actual leg support state, actual movement data of the centroid, actual position data of the two legs and actual force data of the two legs at the current moment.

In this embodiment, the movement planning data of the centroid (center of mass) is used to represent the centroid data corresponding to the pre-planned centroid movement planning trajectory at the current control moment of the biped robot, which includes a horizontal movement planning position of the centroid and a horizontal movement planning velocity of the centroid. The horizontal movement planning position of the centroid represents the planned movement position (including a position component of the horizontal movement planning position of the centroid on the X-axis, and a position component of the horizontal movement planning position of the centroid on the Y axis) of the centroid of the robot on the horizontal plane where the X-axis and the Y-axis are located, and the horizontal movement planning velocity of the centroid represents the planned movement velocity (including a velocity component of the horizontal movement planning velocity of the centroid on the X-axis, and a velocity component of the horizontal movement planning velocity of the centroid on the Y axis) of the centroid of the robot on the horizontal plane where the X-axis and the Y-axis are located The two-leg step planning data is used to represent the leg data corresponding to the pre-planned pose change trajectory of the two legs of the biped robot at the current control moment. The two-leg step planning data includes a joint horizontal planning position and a joint longitudinal planning position of the ankle joints of the two legs (including the ankle joint of the left leg and that of the right leg), and an inter-leg horizontal expected internal force difference. The joint horizontal planning position represents the joint planning position (including a position component of the joint horizontal planning position on the X-axis, and a position component of the joint horizontal planning position on the Y axis) of the ankle joint of the corresponding leg on the horizontal plane where the X-axis and the Y-axis are located; the joint longitudinal planning position represents the joint planning position of the ankle joint of the corresponding leg on the Z axis; the inter-leg horizontal expected internal force difference is used to represent the internal force difference between the horizontal expected internal force of the left leg (including an internal force component of the horizontal expected internal force of the left leg on the X-axis, and an internal force component of the horizontally expected internal force of the left leg on the Y-axis) and the horizontal expected internal force of the right leg (including an internal force component of the horizontal expected internal force of the right leg on the X-axis, and an internal force component of the horizontal expected internal force of the right leg on the Y-axis). In this embodiment, as an example, the inter-leg horizontal expected internal force difference may be zero.

The zero-moment point planning data is used to represent position distribution data corresponding to the pre-planned zero-moment point planning trajectory of the biped robot at the current control moment. The zero-moment point planning data includes a lateral planning position of the zero-moment point that represents a position component of the zero-moment point planning position on the Y axis.

In this process, the biped robot may be simplified into an inverted pendulum model for performing robot dynamics simulation so as to construct a walking planning trajectory corresponding to the biped robot, then the above-mentioned centroid movement planning trajectory, the pose change trajectory of the two legs of the biped robot, and the zero-moment point planning trajectory may be determined.

In this embodiment, the actual leg support state is used to represent the leg support state of the biped robot at the current control moment. In which, if the current control moment is in the two-leg support period, the actual leg support state is just the two-leg support state; otherwise, if the current control moment is in the single-leg support period, the actual leg support state is just the single-leg support state.

The actual movement data of the centroid is used to represent the centroid data of the centroid of the biped robot at the current control moment, which includes an actual horizontal movement position of the centroid and an actual horizontal movement velocity of the centroid. The actual horizontal movement position of the centroid represents the actual movement position (including a position component of the actual horizontal movement position of the centroid on the X axis, and a position component of the actual horizontal movement position of the centroid on the Y axis) of the centroid of the robot on the horizontal plane where the X axis and the Y axis are located, and the actual horizontal movement velocity of the centroid represents the actual movement velocity (including a velocity component of the actual horizontal movement velocity of the centroid on the X axis, and a velocity component of the actual horizontal movement velocity of the centroid on the Y axis) of the centroid of the robot on the horizontal plane where the X axis and the Y axis are located.

The actual position data of the two legs is used to represent the actual positions of the two legs of the biped robot at the current control moment, which includes the actual lateral position of each of the two legs of the biped robot that represents the position component of the actual position data of the biped robot on the Y axis.

The two-leg actual force data is used to represent the force data of the two legs of the biped robot at the current control moment, which includes the actual joint torque of the ankle joints (including the left ankle joint and the right ankle joint) of the two legs, a two-leg longitudinal actual force, and a two-leg horizontal actual force. In which, the ankle joint of each leg includes an ankle side joint and an ankle anterior joint of the leg, and the actual joint torque of the ankle joint of each leg includes an actual joint torque of each of the ankle side joint and the front ankle joint of the leg. The two-leg longitudinal actual force includes the magnitude of the external forces received by the two legs on the Z axis; and the two-leg horizontal actual force represents the magnitude of the external forces acting on each of the two legs on the horizontal plane where the X axis and the Y axis are located, which includes the value of the external force of each of the left leg and the right leg on the X-axis, and the value of the external force of each of the left and the right leg on the Y-axis.

In this process, the actual leg support state, the actual movement data of the centroid, the actual position data of the two legs and the actual force data of the two legs represent the actual motion status of the biped robot at the current control moment.

S220: calculating an expected support force of the two legs based on the zero-moment point planning data and the actual position data of the two legs.

In this embodiment, after the robot control apparatus 10 obtains the current zero-moment point planning data and actual position data of the two legs of the biped robot, it can extract the zero-moment point planned lateral position from the zero-moment point planning data, and extract the actual lateral position of each of the two legs of the biped robot from the actual position data of the two leges, so as to combine the extracted data to calculate the current expected support force of the two legs of the biped robot.

FIG. 5 is a flow chart of sub-steps included in step S220 of FIG. 4. In this embodiment, step S220 may include sub-steps S221 and S222 which accurately determine the current expected two-leg support force of the biped robot.

S221: calculating a gravity sharing coefficient of each of the two legs of the biped robot based on a zero-moment point lateral planning position included in the zero-moment point planning data and an actual lateral position of each of the two legs of the biped robot included in the actual position data of the two legs.

In this embodiment, the sum of the gravity sharing coefficients of the two legs is 1, and the calculation of the gravity sharing coefficient of the right leg is as an equation of:

$$K_f = \frac{|p_{yplan} - p_{lf}|}{|p_{lf} - p_{rf}|};$$

where, $p_{yplan}$ represents the lateral planning position of the zero-moment point, $p_{lf}$ represents the actual lateral position of the left leg, and $p_{rf}$ represents the actual lateral position of the right leg, where $0<=K_f<=1$.

S222: calculating the expected support force of the two legs based on a mass of the biped robot and the gravity sharing coefficient of each of the two legs of the biped robot.

In this embodiment, the expected support force of the two legs may include the expected support force of each of the left leg and the right leg of the biped robot, and the expected support force of the left leg of the biped robot is a product value between the gravity sharing coefficient of the left leg and the gravity of the biped robot, and the expected support force of the right leg of the biped robot is a product value between the gravity sharing coefficient of the right leg and the gravity of the biped robot. In which, the gravity of the biped robot is a product value between the mass of the biped robot and the current gravitational acceleration.

Therefore, the present disclosure can accurately determine the current expected support force of the two legs of the biped robot related to the actual motion status by performing the above-mentioned sub-step S221 and sub-step S222.

S230: calculating, using a compliance control algorithm, a desired joint posture angle of ankle joints of the two legs based on the expected support force of the two legs, the movement planning data of the centroid, the actual movement data of the centroid, and the actual force data of the two leg.

In this embodiment, the robot control apparatus 10 may combine the obtained movement planning data of the centroid, the actual movement data of the centroid, and the actual force data of the two legs with the calculated expected support force of the two legs, and at the leg posture dimension level, the compliant control algorithm is used to determine the current desired joint posture angle of the ankle joints of the two legs of the biped robot, so that the posture of the sole of the leg of the robot can be ensured to substantially match the actual ground conditions through the determined desired joint posture angle, thereby improving the walking stability of the biped robot.

Figure 6:
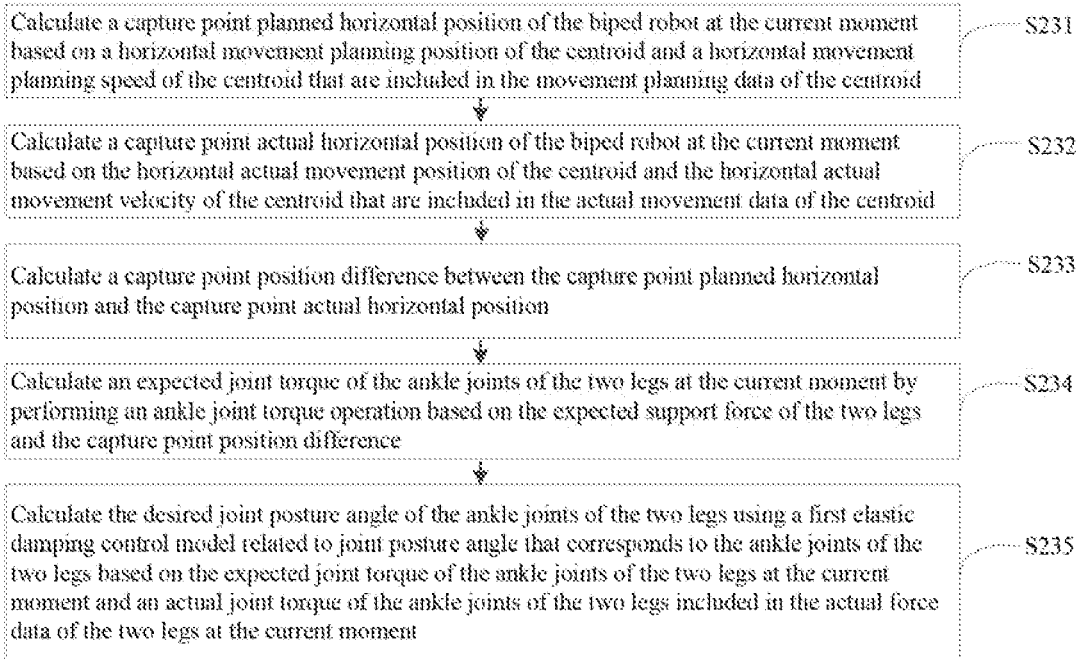
FIG. 6 is a flow chart of sub-steps included in step S230 of FIG. 4.

FIG. 6 is a flow chart of sub-steps included in step S230 of FIG. 4. In this embodiment, the step S230 may include sub-steps S231-S235 which accurately determine, at the leg posture dimension level, determine the desired joint posture angle of the ankle joints of the two legs with reference to the current actual motion status of the biped robot that is for adapting to the actual ground conditions.

S231: calculating a capture point planned horizontal position of the biped robot at the current moment based on a horizontal movement planning position of the centroid and a horizontal movement planning velocity of the centroid that are included in the movement planning data of the centroid.

In this embodiment, the determination algorithm of capture point in the inverted pendulum model may be expressed as $$\xi_1 = x + \frac{\dot{x}}{\omega} \text{ and } \xi_2 = y + \frac{\dot{y}}{\omega}.$$

In which, $\xi_1$ is used to represent the position component of a capture point position of the biped robot on the X axis, x is used to represent the position component of the inverted pendulum centroid position of the biped robot on the X axis, and $\dot{x}$ is used to represent the velocity component of the inverted pendulum centroid velocity of the biped robot on the X axis, $\xi_2$ is used to represent the position component of the capture point position of the biped robot on the Y axis, y is used to represent the inverted pendulum centroid position of the biped robot on the Y axis, $\dot{y}$ is used to represent the velocity component of the inverted pendulum centroid velocity of the biped robot on the Y axis, and ω is used to represent the leg swing frequency of the biped robot and its value is equal to the square root of the ratio between the acceleration of gravity and the position component of the inverted pendulum centroid position on the Z axis.

Therefore, the capture point planned horizontal position may include the position component of the capture point planned position on the X-axis and that of the capture point planned position on the Y-axis, and the position component of the horizontal movement planning position of the centroid on the X-axis and the velocity component of the horizontal movement planning velocity on the X axis may be substituted into the above-mentioned equation $$\xi_1 = x + \frac{\dot{x}}{\omega}$$

to calculate the position component of the capture point planned position on the X axis, and the position component of the horizontal movement planning position of the centroid on the Y-axis and the velocity component of the horizontal movement planning velocity on the Y axis may be substituted into the above-mentioned equation $$\xi_2 = y + \frac{\dot{y}}{\omega}$$

to calculate the position component of the capture point planned position on the Y axis.

S232: calculating a capture point actual horizontal position of the biped robot at the current moment based on the actual horizontal movement position of the centroid and the actual horizontal movement velocity of the centroid that are included in the actual movement data of the centroid.

In this embodiment, the capture point actual horizontal position may include a position component of the capture point actual position on the X axis and that of the capture point actual position on the Y axis. The position component of the actual horizontal movement position of the centroid on the X axis and the velocity component of the actual horizontal movement velocity of the centroid on the X axis nay be substituted into the above-mentioned equation $$\xi_1 = x + \frac{\dot{x}}{\omega}$$

to calculate the position component of the capture point actual position on the X-axis, and the position component of the actual horizontal movement position of the centroid on the Y axis and the velocity component of the actual horizontal movement velocity of the centroid on the Y axis nay be substituted into the above-mentioned equation $$\xi_2 = y + \frac{\dot{y}}{\omega}$$

to calculate the position component of the capture point actual position on the Y-axis.

S233: calculating a capture point position difference between the capture point planned horizontal position and the capture point actual horizontal position.

In this embodiment, the capture point position difference may include a difference component of the capture point position difference on the X axis and that of the capture point position difference on the Y axis. In which, the position component of the capture point planned position on the X axis that is included in the capture point planned horizontal position may be subtracted from the position component of the capture point actual position on the X axis that is included in the capture point actual horizontal position, so as to obtain the difference component of the capture point position difference on the X axis; and the position component of the capture point planned position on the Y axis that is included in the capture point planned horizontal position may be subtracted from the position component of the capture point actual position on the Y axis that is included in the capture point actual horizontal position, so as to obtain the difference component of the capture point position difference on the Y axis.

S234: calculating an expected joint torque of the ankle joints of the two legs at the current moment by performing an ankle joint torque operation based on the expected support force of the two legs and the capture point position difference.

In this embodiment, the expected joint torque of the ankle joint of each leg includes the expected joint torque of the ankle side joint and ankle anterior joint of the leg. At this time, the expected joint torque of the ankle side joint of the leg is a product value between the expected support force of the leg and the difference component of the capture point position difference on the X-axis, the expected joint torque of the ankle anterior joint of the leg is a product value of the expected support force of the leg and the difference component of the capture point position difference on the Y-axis.

S235: calculating the desired joint posture angle of the ankle joints of the two legs using a first elastic damping control model related to joint posture angle that corresponds to the ankle joints of the two legs based on the expected joint torque of the ankle joints of the two legs at the current moment and an actual joint torque of the ankle joints of the two legs included in the actual force data of the two legs at the current moment.

In this embodiment, the first elastic damping control model may be as an equation of:

$$\dot{R}=K_{P1}(T_d-T_m)-K_{S1}R;$$

where, $\dot{R}$ represents the expected angular velocity of any of the ankle joints of the two legs at the current moment, $T_d$ represents the desired joint posture angle of the ankle joints of the two legs at the current moment, $T_m$ represents the expected joint torque of the ankle joint of the leg at the current moment, $K_{P1}$ represents a first controller damping parameter vector for joint posture, and $K_{S1}$ represents a first controller stiffness parameter vector for joint posture, where $\dot{R}$ is the first derivative of R.

Therefore, the robot control apparatus 10 may calculate the joint posture angle using the first elastic damping control model by substituting the expected joint torque and actual joint torque of the corresponding joint for the ankle side joint of the left leg, the ankle anterior joint of the left leg, the ankle side joint of the right leg, and the ankle anterior joint of the right leg, so as to obtain the desired joint posture angles of each of the ankle side joint of the left leg, the ankle anterior joint of the left leg, the ankle side joint of the right leg, and the ankle anterior joint of the right leg, thereby ensuring that the of the posture of the sole of the leg of the biped robot can substantially match the actual ground conditions under the condition that the corresponding ankle joints of the two legs maintain the desired joint posture angle.

Therefore, in the present disclosure, compliant control can be performed on the biped robot at the leg posture dimension level by performing the above-mentioned sub-steps S231-S235, so as to determine the desired joint posture angle of the ankle joints of the two legs with reference to the current actual motion status of the biped robot that is for adapting to the actual ground conditions.

S240: calculating a desired joint position of the ankle joints of the two legs that matches the actual leg support state based on the expected support force of the two legs, the movement planning data of the centroid, the actual movement data of the centroid, and the actual force data of the two legs.

In this embodiment, the robot control apparatus 10 may combine the obtained step planning data and actual force data of the two legs with the calculated expected support force of the two legs, and calculate, at the leg position dimension level, the desired joint position of the ankle joints of the two legs that matches the actual leg support state using the compliance control algorithm, so as to ensure that the position of the sole of the leg of the robot substantially matches the actual ground conditions through the determined desired joint position, thereby improving the walking stability of the biped robot.

Figure 7:
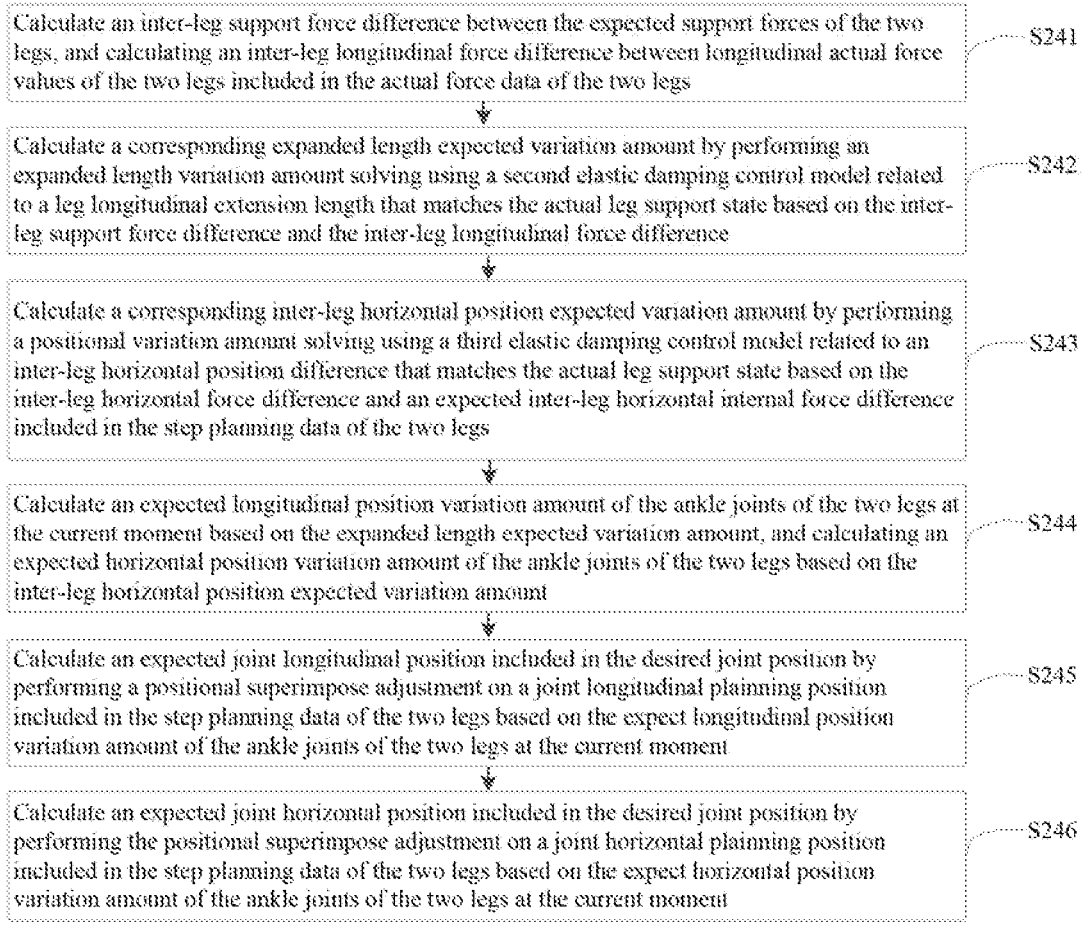
FIG. 7 is a flow chart of sub-steps included in step S240 of FIG. 4.

FIG. 7 is a flow chart of sub-steps included in step S240 of FIG. 4. As shown in FIG. 4, in this embodiment, the step S240 may include sub-steps S241-S246 which accurately determine, at the leg position dimension level, determine the desired joint position of the ankle joints of the two legs with reference to the current actual motion status of the biped robot that is for adapting to the actual ground conditions.

S241: calculating an inter-leg support force difference between the expected support forces of the two legs, and calculating an inter-leg longitudinal force difference between longitudinal actual force values of the two legs included in the actual force data of the two legs.

In this embodiment, the inter-leg support force difference may be the difference between the expected support force of the left leg and that of the right leg of the biped robot. The inter-leg longitudinal force difference may be the difference between the actual longitudinal force of the left leg and that of the right leg, and the inter-leg horizontal force difference may be the difference between the actual horizontal force of the left leg and that of the right leg. The inter-leg horizontal force difference may include a force difference component of the inter-leg horizontal force difference on the X-axis, and a force difference component of the inter-leg horizontal force difference on the Y-axis.

S242: calculating a corresponding expanded length expected variation amount by performing an expanded length variation amount solving using a second elastic damping control model related to a leg longitudinal extension length that matches the actual leg support state based on the inter-leg support force difference and the inter-leg longitudinal force difference.

In this embodiment, the leg longitudinal extension length is used to represent the length of the biped robot from its hip to the foot on the Z axis, and the second elastic damping control model may be as an equation of:

$$\dot{u}_Z = K_{P2}(\Delta F_Z - \Delta F_{dZ}) - K_{S2} u_Z;$$

where, $\dot{u}_Z$ represents an expected change speed of the leg longitudinal extension length at the current moment, $u_Z$ represents an expected variation amount of the leg longitudinal extension length at the current moment, $\Delta F_Z$ represents the inter-leg support force difference, $\Delta F_{dZ}$ represents the inter-leg support force difference, $K_{P2}$ represents a second controller damping parameter vector for the leg longitudinal extension length at the current moment, and $K_{S2}$ represents a second controller stiffness parameter vector for the leg longitudinal extension length that matches the actual leg support state, where $\dot{u}_Z$ is the first derivative of $u_Z$.

Figure 8:
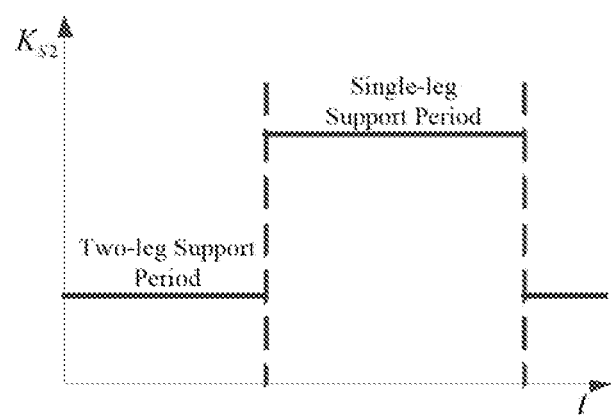
FIG. 8 is a schematic diagram of the stiffness adjustment of a second elastic damping control model according to an embodiment of the present disclosure.

FIG. 8 is a schematic diagram of the stiffness adjustment of a second elastic damping control model according to an embodiment of the present disclosure. As shown in FIG. 8, in this embodiment, the values of the parameter vector of the second controller stiffness parameter vector of the second elastic damping control model are different in the time periods corresponding to different leg support states. In which, the value of the parameter vector of the second controller stiffness parameter vector in the two-leg support period (i.e., the time period in which the actual leg support state is the two-leg support state) is less than that of the second controller stiffness parameter vector in the single-leg support period (i.e., the time period in which the actual leg support state is the single-leg support state).

If the current control moment of the biped robot is within the two-leg support period, the robot control apparatus 10 may realize the low stiffness compliant control of the longitudinal position of the sole of the leg through the second controller stiffness parameter vector that currently has a small value, so that the biped robot has enough strength to realize the tracking of the expected force in the two-leg support state so as to reduce the impact of the force, thereby realizing the adaptation of the sole of the leg to the terrain of the ground.

If the current control moment of the biped robot is within the single-leg support period, the robot control apparatus 10 can realize the high-stiffness compliant control of the longitudinal position of the sole of the leg through the second controller stiffness parameter vector that currently has a large value, so that the biped robot has enough strength to cause the longitudinal extending length of the leg to restore to the default state in the single-leg support state.

S243: calculating a corresponding inter-leg horizontal position expected variation amount by performing a positional variation amount solving using a third elastic damping control model related to an inter-leg horizontal position difference that matches the actual leg support state based on the inter-leg horizontal force difference and an expected inter-leg horizontal internal force difference included in the step planning data of the two legs.

In this embodiment, the inter-leg horizontal position difference is used to represent the position difference between the two legs on the horizontal plane where the X-axis and the Y-axis are located. The inter-leg horizontal position expected variation amount may include a variation amount component of the inter-leg horizontal position expected variation amount on the X-axis, and that of the inter-leg horizontal position expected variation amount on the Y-axis. In which, the third elastic damping control model may be as an equation of:

$$\dot{u}_L = K_{P3}(\Delta F_{dL} - \Delta F_L) - K_{S3} u_L;$$

where, $\dot{u}_L$ represents an expected change speed of an inter-leg horizontal position of the inter-leg horizontal position difference at the current moment, $u_L$ represents the inter-leg horizontal position expected variation amount of the inter-leg horizontal position difference at the current moment, $\Delta F_L$ represents the inter-leg horizontal force difference, $\Delta F_{dL}$ represents the expected inter-leg horizontal internal force difference, $K_{P3}$ represents a third controller damping parameter vector for the inter-leg horizontal position difference, and $K_{S3}$ represents a third controller stiffness parameter vector for the inter-leg horizontal position difference that matches the actual leg support state, where $\dot{u}_L$ is the first derivative of $u_L$.

Figure 9:
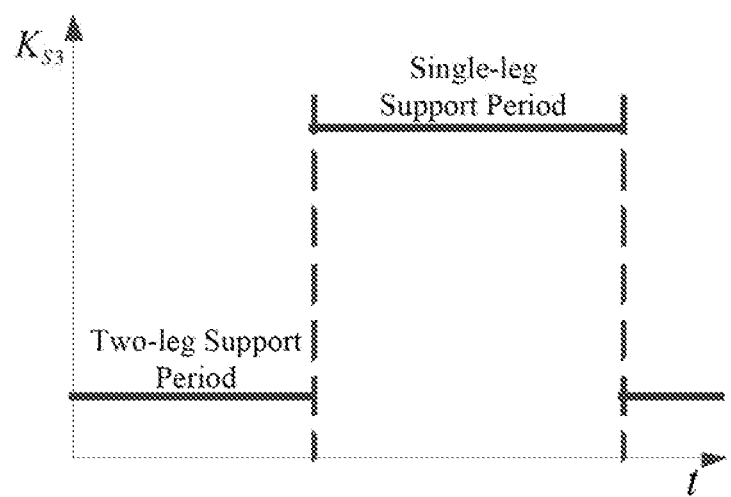
FIG. 9 is a schematic diagram of the stiffness adjustment of a third elastic damping control model according to an embodiment of the present disclosure.

FIG. 9 is a schematic diagram of the stiffness adjustment of a third elastic damping control model according to an embodiment of the present disclosure. As shown in FIG. 9, in this embodiment, the values of the parameter vector of the third controller stiffness parameter vector of the third elastic damping control model are different in the time periods corresponding to different leg support states. In which, the value of the parameter vector of the third controller stiffness parameter vector in the two-leg support period (i.e., the time period in which the actual leg support state is the two-leg support state) is less than that of the third controller stiffness parameter vector in the single-leg support period (i.e., the time period in which the actual leg support state is the single-leg support state).

If the current control moment of the biped robot is within the two-leg support period, the robot control apparatus 10 can realize the low stiffness compliant control of the horizontal position of the sole through the third controller stiffness parameter vector that currently has a small value, so that the biped robot can effectively cause the distance between the two legs in the horizontal plane to restore to the default state in the two-leg support state, and simultaneously eliminate the internal force between the two legs in the horizontal plane.

If the current control moment of the biped robot is within the single-leg support period, the robot control apparatus 10 can realize the high stiffness compliant control of the horizontal position of the sole through the third controller stiffness parameter vector that currently has a large value, so that the biped robot can effectively cause the distance between the two legs in the horizontal plane to restore to the default state in the single-leg support state, and simultaneously eliminate the internal force between the two legs in the horizontal plane.

In this case, the robot control apparatus 10 may calculate, using the above-mentioned third elastic damping control model, the variation amount component of the inter-leg horizontal position expected variation amount on the Y-axis by substituting the force difference component of the inter-leg horizontal force difference on the X-axis, the internal force difference component of the inter-leg horizontal expected internal force difference on the X-axis, the parameter vector component of the third controller damping parameter vector on the X-axis, and the parameter vector component of the third controller stiffness parameter vector on the X axis.

At the same time, the robot control apparatus 10 may calculate, using the above-mentioned third elastic damping control model, the variation amount component of the inter-leg horizontal position expected variation amount on the Y-axis by substituting the force difference component of the inter-leg horizontal force difference on the Y-axis, the internal force difference component of the inter-leg horizontal expected internal force difference on the Y-axis, the parameter vector component of the third controller damping parameter vector on the Y axis, and the parameter vector component of the third controller stiffness parameter vector on the Y-axis.

S244: calculating an expected longitudinal position variation amount of the ankle joints of the two legs at the current moment based on the expanded length expected variation amount, and calculating an expected horizontal position variation amount of the ankle joints of the two legs based on the inter-leg horizontal position expected variation amount.

In this embodiment, the expected variation amount of the current longitudinal position of the left ankle joint may be obtained by multiplying the expanded length expected variation amount by −0.5, and the expected variation amount of the current longitudinal position of the right ankle joint may be obtained by multiplying the expanded length expected variation amount by 0.5.

At the same time, the variation amount component of the expected variation amount of the current horizontal position of the left ankle joint on the X-axis may be obtained by multiplying the variation amount component of the inter-leg horizontal position expected variation amount on the X-axis by −0.5, the variation amount component of the expected variation amount of the current horizontal position of the right ankle joint on the X-axis may be obtained by multiplying the variation amount component of the inter-leg horizontal position expected variation amount on the X-axis by 0.5.

The variation amount component of the expected variation amount of the current horizontal position of the left ankle joint on the Y-axis may be obtained by multiplying the variation amount component of the inter-leg horizontal position expected variation amount on the Y-axis by −0.5, the variation amount component of the expected variation amount of the current horizontal position of the right ankle joint on the Y-axis may be obtained by multiplying the variation amount component of the inter-leg horizontal position expected variation amount on the Y-axis by 0.5.

S245: calculating an expected joint longitudinal position included in the desired joint position by performing a positional superimpose adjustment on a joint longitudinal planning position included in the step planning data of the two legs based on the expect longitudinal position variation amount of the ankle joints of the two legs at the current moment.

In this embodiment, the robot control apparatus 10 may obtain the expected joint longitudinal position of the left ankle joint by superimposing and adjusting the current expected variation amount of the longitudinal position of the left ankle joint and the joint longitudinal planned position of the left ankle joint, and obtain the expected joint longitudinal position of the right ankle joint by superimposing and adjusting the current expected variation amount of the longitudinal position of the of the longitudinal position of the right ankle joint and the joint longitudinal planned position of the right ankle joint.

S246: calculating an expected joint horizontal position included in the desired joint position by performing the positional superimpose adjustment on a joint horizontal planning position included in the step planning data of the two legs based on the expect horizontal position variation amount of the ankle joints of the two legs at the current moment.

In this embodiment, the robot control apparatus 10 may obtain the position component of the horizontal expected position of the left ankle joint on the X-axis by superimposing and adjusting the variation amount component of the current expected variation amount of the horizontal position of the left ankle joint on the X-axis and the position component of the joint horizontal planned position of the left ankle joint on the X-axis, and may obtain the position component of the horizontal expected position of the left ankle joint on the Y-axis by superimposing and adjusting the variation amount component of the current expected variation amount of the horizontal position of the left ankle joint on the Y-axis and the position component of the joint horizontal planned position of the left ankle joint on the Y-axis.

At the same time, the robot control apparatus 10 may further obtain the position component of the horizontal expected position of the right ankle joint on the X-axis by superimposing and adjusting the variation amount component of the current expected variation amount of the horizontal position of the right ankle joint on the X-axis and the position component of the joint horizontal planned position of the right ankle joint on the X-axis, and may obtain the position component of the horizontal expected position of the right ankle joint on the Y-axis by superimposing and adjusting the variation amount component of the current expected variation amount of the horizontal position of the right ankle joint on the Y-axis and the position component of the joint horizontal planned position of the right ankle joint on the Y-axis.

Therefore, in the present disclosure, compliant control can be performed on the biped robot at the leg posture dimension level by performing the above-mentioned sub-steps S241-S246 to determine the desired joint position of the ankle joints of the two legs with reference to the current actual motion status of the biped robot that is for adapting to the actual ground conditions, so as to ensure that the position of the sole of the leg of the robot substantially matches the actual ground condition when the corresponding ankle joints of the two legs maintains the desired joint position, thereby improving the walking stability and the terrain adaptability of the biped robot.

S250: controlling the biped robot to perform a stepping motion according to the desired joint posture angle and the desired joint position of the ankle joints of the two legs.

In this embodiment, after the robot control apparatus 10 calculates the desired joint posture angle and desired joint positions that can maintain the pose of the sole of the leg of the robot substantially matching the actual ground conditions, it can correspondingly control the joint structures contained in the biped robots to cooperate with each other to cause the ankle joints of the two legs of the biped robot to exhibit the desired joint posture angle and the desired joint position, so as to effectively reduce the landing impact force of the biped robot during the single-leg support period and effectively reduce the inter-leg internal force of the biped robot during the two-leg support period, thereby improving the walking stability and terrain adaptability of the biped robot.

Therefore, in the present disclosure, all-direction compliant control can be performed on the biped robot at the leg position dimension level according to the actual motion status of the biped robot during the walking process of the biped robot by performing the above-mentioned sub-steps S210-S250, so that the desired leg pose condition (including the desired leg position and the desired leg posture) of the biped robot substantially matches the actual ground condition, so as to effectively reduce the landing impact force of the biped robot during the single-leg support period through the desired leg pose condition and effectively reduce the inter-leg internal force of the biped robot during the two-leg support period, thereby improving the walking stability and terrain adaptability of the biped robot.

In the present disclosure, in order to ensure that the robot control apparatus 10 can perform the above-mentioned robot step control method through the robot step controller 100, the forgoing functions is implemented by dividing the robot step controller 100 into functional modules. The specific composition of the robot step controller 100 provided in the present disclosure will be described accordingly below.

Figure 10:
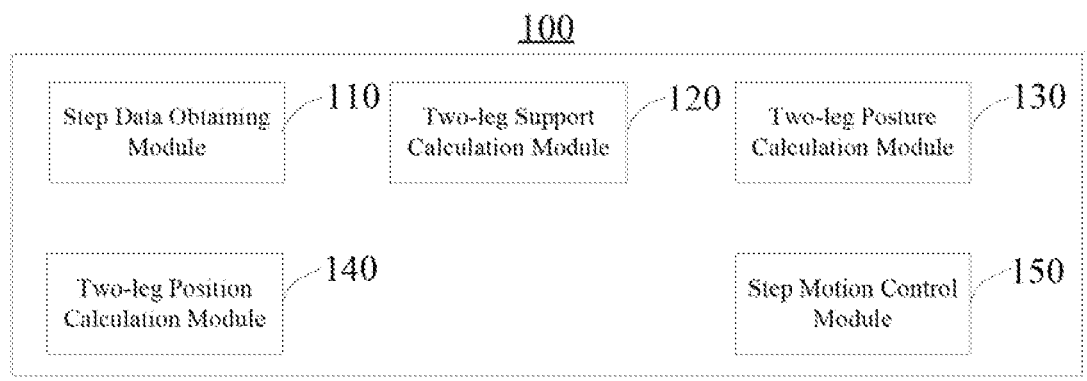
FIG. 10 is a schematic block diagram of the structure of a robot step controller according to an embodiment of the present disclosure.

FIG. 10 is a schematic block diagram of the structure of a robot step controller according to an embodiment of the present disclosure. As shown in FIG. 10, in this embodiment, a robot step controller 100 is provided. The robot step controller 100 may include a step data obtaining module 110, a two-leg support calculation module 120, a wo-leg posture calculation module 130, a wo-leg position calculation module 140, and a step motion control module 150.

The step data obtaining module 110 is configured to obtain movement planning data of a centroid of the biped robot, step planning data of two legs of the biped robot and zero-moment point planning data of the biped robot at a current moment, and an actual leg support state, actual movement data of the centroid, actual position data of the two legs and actual force data of the two legs at the current moment.

The two-leg support calculation module 120 is configured to calculate an expected support force of the two legs based on the zero-moment point planning data and the actual position data of the two legs.

The wo-leg posture calculation module 130 is configured to calculate, using a compliance control algorithm, a desired joint posture angle of ankle joints of the two legs based on the expected support force of the two legs, the movement planning data of the centroid, the actual movement data of the centroid, and the actual force data of the two legs.

The wo-leg position calculation module 140 is configured to calculate a desired joint position of the ankle joints of the two legs that matches the actual leg support state based on the expected support force of the two legs, the movement planning data of the centroid, the actual movement data of the centroid, and the actual force data of the two legs.

The step motion control module 150 is configured to control the biped robot to perform a stepping motion according to the desired joint posture angle and the desired joint position of the ankle joints of the two legs.

It should be noted that, the robot step control 100 provided by this embodiment has the same basic principles and technical effects as the above-mentioned robot step control method. For a brief description, for parts not mentioned in this embodiment, reference may be made to the forgoing description of the robot step control method.

In addition, in the embodiments of the present disclosure, a non-transitory storage medium may also be provided, so as to store the computer program expressed in the form of a software product in the forgoing technical solution of the present disclosure through the storage medium. In which, the computer program may include a plurality of instructions to enable a computer device (which may be a personal computer, a server, a network device, or the like) to execute all or part of the steps of the robot step control method corresponding to each embodiment of the present disclosure. The above-mentioned storage medium includes a variety of media such as a USB disk, a mobile hard disk, a read-only memory (ROM), a random access memory (RAM), a magnetic disk, and an optical disk which is capable of storing program codes.

In summary, in the robot step control method and apparatus, the robot control apparatus, and the storage medium provided by the present disclosure, it determines the corresponding expected support force of the two legs according to the zero-moment point planning data and the actual position data of the two legs of the biped robot at the current moment, and calculates the current desired joint posture angle of the ankle joints of the two legs using the compliance control algorithm based on the expected support force of the two legs and the movement planning data of the centroid, the actual movement data of the centroid and the actual force data of the two legs of the biped robot at the current moment, and then calculates the desired joint position of the ankle joints of the two legs that matches the current actual leg support state using the compliance control algorithm based on the step planning data of the two legs, the expected support force of the two legs, and the actual force data of the two legs of the biped robot at the current moment, so as to control the biped robot to perform the stepping motion according to the desired joint pose condition of the ankle joints of the two legs. In such manner, all-direction compliant controls can be performed on the desired leg pose condition according to the actual motion status of the biped robot, so that both the desired leg position and the desired leg posture are substantially matched with the actual ground conditions so as to reduce the landing impact force of the biped robot during the single-leg support period and the inter-leg internal force of the biped robot during the two-leg support period, thereby improving the walking stability and terrain adaptability of the biped robot.

The forgoing is only various embodiments of the present disclosure, while the scope of the present disclosure is not limited thereto. For those skilled in the art, equivalent modifications or replacements that can be easily conceived within the technical scope of the present disclosure should be included within the scope of the present disclosure. Therefore, the scope of the present disclosure should be determined in accordance with the scope of the claims.

What is claimed is:

1. A computer-implemented step control method for a biped robot, comprising:
   obtaining movement planning data of a centroid of the biped robot, step planning data of two legs of the biped robot and zero-moment point planning data of the biped robot at a current moment, and an actual leg support state, actual movement data of the centroid, actual position data of the two legs and actual force data of the two legs at the current moment, wherein the movement planning data of the centroid is used to represent centroid data corresponding to a pre-planned centroid movement planning trajectory at the current moment of the biped robot, and comprises: a horizontal movement planning position of the centroid, and a horizontal movement planning velocity of the centroid, and wherein the actual movement data of the centroid is used to represent centroid data of the centroid of the biped robot at the current moment, and comprises: an actual horizontal movement position of the centroid, and an actual horizontal movement velocity of the centroid;
   calculating an expected support force of the two legs based on the zero-moment point planning data and the actual position data of the two legs;
   calculating, using a compliance control algorithm, a desired joint posture angle of ankle joints of the two legs based on the expected support force of the two legs, the movement planning data of the centroid, the actual movement data of the centroid, and the actual force data of the two legs;
   calculating a desired joint position of the ankle joints of the two legs that matches the actual leg support state based on the expected support force of the two legs, the movement planning data of the centroid, the actual movement data of the centroid, and the actual force data of the two legs; and
   controlling the biped robot to perform a stepping motion according to the desired joint posture angle and the desired joint position of the ankle joints of the two legs.

2. The method of claim 1, wherein the calculating the expected support force of the two legs based on the zero-moment point planning data and the actual position data of the two legs comprises:
   calculating a gravity sharing coefficient of each of the two legs of the biped robot based on a zero-moment point lateral planning position included in the zero-moment point planning data and an actual lateral position of each of the two legs of the biped robot included in the actual position data of the two legs; and
   calculating the expected support force of the two legs based on a mass of the biped robot and the gravity sharing coefficient of each of the two legs of the biped robot.

3. The method of claim 2, wherein a sum of gravity sharing coefficients of the two legs is 1; and
   wherein the expected support force of the two legs comprises an expected support force of each of a left leg and a right leg of the biped robot, the expected support force of the left leg of the biped robot is a product value between the gravity sharing coefficient of the left leg and a gravity of the biped robot, and the expected support force of the right leg of the biped robot is a product value between the gravity sharing coefficient of the right leg and the gravity of the biped robot.

4. The method of claim 1, wherein the calculating, using the compliance control algorithm, the desired joint posture angle of the ankle joints of the two legs based on the expected support force of the two legs, the movement planning data of the centroid, the actual movement data of the centroid, and the actual force data of the two legs comprises:
   calculating a capture point planned horizontal position of the biped robot at the current moment based on the horizontal movement planning position of the centroid and the horizontal movement planning velocity of the centroid;
   calculating a capture point actual horizontal position of the biped robot at the current moment based on the actual horizontal movement position of the centroid and the actual horizontal movement velocity of the centroid;

calculating a capture point position difference between the capture point planned horizontal position and the capture point actual horizontal position;

calculating an expected joint torque of the ankle joints of the two legs at the current moment by performing an ankle joint torque operation based on the expected support force of the two legs and the capture point position difference; and calculating the desired joint posture angle of the ankle joints of the two legs using a first elastic damping control model related to joint posture angle that corresponds to the ankle joints of the two legs based on the expected joint torque of the ankle joints of the two legs at the current moment and an actual joint torque of the ankle joints of the two legs included in the actual force data of the two legs at the current moment.

5. The method of claim 4, wherein the first elastic damping control model is as an equation of:

$$\dot{R}=K_{P1}(T_d-T_m)-K_{S1}R;$$

where, $\dot{R}$ represents the expected angular velocity of any of the ankle joints of the two legs at the current moment, $T_d$ represents the desired joint posture angle of the ankle joints of the two legs at the current moment, $T_m$ represents the expected joint torque of the ankle joint of the leg at the current moment, $K_{P1}$ represents a first controller damping parameter vector for joint posture, and $K_{S1}$ represents a first controller stiffness parameter vector for joint posture, where $\dot{R}$ is the first derivative of R.

6. The method of claim 1, wherein the calculating the desired joint position of the ankle joints of the two legs that matches the actual leg support state based on the expected support force of the two legs, the movement planning data of the centroid, the actual movement data of the centroid, and the actual force data of the two legs comprises:

calculating an inter-leg support force difference between the expected support forces of the two legs, and calculating an inter-leg longitudinal force difference between longitudinal actual force values of the two legs included in the actual force data of the two legs;

calculating a corresponding expanded length expected variation amount by performing an expanded length variation amount solving using a second elastic damping control model related to a leg longitudinal extension length that matches the actual leg support state based on the inter-leg support force difference and the inter-leg longitudinal force difference;

calculating a corresponding inter-leg horizontal position expected variation amount by performing a positional variation amount solving using a third elastic damping control model related to an inter-leg horizontal position difference that matches the actual leg support state based on the inter-leg horizontal force difference and an expected inter-leg horizontal internal force difference included in the step planning data of the two legs;

calculating an expected longitudinal position variation amount of the ankle joints of the two legs at the current moment based on the expanded length expected variation amount, and calculating an expected horizontal position variation amount of the ankle joints of the two legs based on the inter-leg horizontal position expected variation amount;

calculating an expected joint longitudinal position included in the desired joint position by performing a positional superimpose adjustment on a joint longitudinal planning position included in the step planning data of the two legs based on the expect longitudinal position variation amount of the ankle joints of the two legs at the current moment; and calculating an expected joint horizontal position included in the desired joint position by performing the positional superimpose adjustment on a joint horizontal planning position included in the step planning data of the two legs based on the expect horizontal position variation amount of the ankle joints of the two legs at the current moment.

7. The method of claim 6, wherein the second elastic damping control model is as an equation of:

$$\dot{u}_Z=K_{P2}(\Delta F_Z-\Delta F_{dX})-K_{S2}u_Z;$$

where, $\dot{u}_Z$ represents an expected change speed of the leg longitudinal extension length at the current moment, $u_Z$ represents an expected variation amount of the leg longitudinal extension length at the current moment, $\Delta F_Z$ represents the inter-leg support force difference, $\Delta F_{dZ}$ represents the inter-leg support force difference, $K_{P2}$ represents a second controller damping parameter vector for the leg longitudinal extension length at the current moment, and $K_{S2}$ represents a second controller stiffness parameter vector for the leg longitudinal extension length that matches the actual leg support state, where $\dot{u}_Z$ is the first derivative of $u_Z$, the actual leg support state is that the second controller stiffness parameter vector in a single-leg support state of the robot is larger than the second controller stiffness parameter when the actual leg support state is a two leg support state of the robot.

8. The method of claim 6, wherein the third elastic damping control model is as an equation of:

$$\dot{u}_L=K_{P3}(\Delta F_{dL}-\Delta F_L)-K_{S3}u_L;$$

where, $\dot{u}_L$ represents an expected change speed of an inter-leg horizontal position of the inter-leg horizontal position difference at the current moment, $u_L$ represents the inter-leg horizontal position expected variation amount of the inter-leg horizontal position difference at the current moment, $\Delta F_L$ represents the inter-leg horizontal force difference, $\Delta F_{dL}$ represents the expected inter-leg horizontal internal force difference, $K_{P3}$ represents a third controller damping parameter vector for the inter-leg horizontal position difference, and $K_{S3}$ represents a third controller stiffness parameter vector for the inter-leg horizontal position difference that matches the actual leg support state, where $\dot{u}_L$ is the first derivative of $u_L$, the actual leg support state is that the third controller stiffness parameter vector in a single-leg support state of the robot is larger than the third controller stiffness parameter when the actual leg support state is a two leg support state of the robot.

9. A robot control apparatus, comprising:
a processor;
a memory coupled to the processor; and
one or more computer programs stored in the memory and executable on the processor;
wherein, the one or more computer programs comprise:
instructions for obtaining movement planning data of a centroid of a biped robot, step planning data of two legs of the biped robot and zero-moment point planning data of the biped robot at a current moment, and an actual leg support state, actual movement data of the centroid, actual position data of the two legs and actual force data of the two legs at the current moment;

instructions for calculating an expected support force of the two legs based on the zero-moment point planning data and the actual position data of the two legs;

instructions for calculating, using a compliance control algorithm, a desired joint posture angle of ankle joints of the two legs based on the expected support force of the two legs, the movement planning data of the centroid, the actual movement data of the centroid, and the actual force data of the two legs;

instructions for calculating a desired joint position of the ankle joints of the two legs that matches the actual leg support state based on the expected support force of the two legs, the movement planning data of the centroid, the actual movement data of the centroid, and the actual force data of the two legs; and instructions for controlling the biped robot to perform a stepping motion according to the desired joint posture angle and the desired joint position of the ankle joints of the two legs;

wherein the instructions for calculating, using the compliance control algorithm, the desired joint posture angle of the ankle joints of the two legs based on the expected support force of the two legs, the movement planning data of the centroid, the actual movement data of the centroid, and the actual force data of the two legs comprise:

instructions for calculating a capture point planned horizontal position of the biped robot at the current moment based on a horizontal movement planning position of the centroid and a horizontal movement planning velocity of the centroid that are included in the movement planning data of the centroid;

instructions for calculating a capture point actual horizontal position of the biped robot at the current moment based on the actual horizontal movement position of the centroid and the actual horizontal movement velocity of the centroid that are included in the actual movement data of the centroid;

instructions for calculating a capture point position difference between the capture point planned horizontal position and the capture point actual horizontal position;

instructions for calculating an expected joint torque of the ankle joints of the two legs at the current moment by performing an ankle joint torque operation based on the expected support force of the two legs and the capture point position difference; and instructions for calculating the desired joint posture angle of the ankle joints of the two legs using a first elastic damping control model related to joint posture angle that corresponds to the ankle joints of the two legs based on the expected joint torque of the ankle joints of the two legs at the current moment and an actual joint torque of the ankle joints of the two legs included in the actual force data of the two legs at the current moment.

10. The robot control apparatus of claim 9, wherein the instructions for calculating the expected support force of the two legs based on the zero-moment point planning data and the actual position data of the two legs comprise:

instructions for calculating a gravity sharing coefficient of each of the two legs of the biped robot based on a zero-moment point lateral planning position included in the zero-moment point planning data and an actual lateral position of each of the two legs of the biped robot included in the actual position data of the two legs; and instructions for calculating the expected support force of the two legs based on a mass of the biped robot and the gravity sharing coefficient of each of the two legs of the biped robot.

11. The robot control apparatus of claim 9, wherein the first elastic damping control model is as an equation of:

$$\dot{R}=K_{P1}(T_d-T_m)-K_{S1}R;$$

where, $\dot{R}$ represents the expected angular velocity of any of the ankle joints of the two legs at the current moment, $T_d$ represents the desired joint posture angle of the ankle joints of the two legs at the current moment, $T_m$ represents the expected joint torque of the ankle joint of the leg at the current moment, $K_{P1}$ represents a first controller damping parameter vector for joint posture, and $K_{S1}$ represents a first controller stiffness parameter vector for joint posture, where $\dot{R}$ is the first derivative of R.

12. The robot control apparatus of claim 9, wherein the instructions for calculating the desired joint position of the ankle joints of the two legs that matches the actual leg support state based on the expected support force of the two legs, the movement planning data of the centroid, the actual movement data of the centroid, and the actual force data of the two legs comprise:

instructions for calculating an inter-leg support force difference between the expected support forces of the two legs, and calculating an inter-leg longitudinal force difference between longitudinal actual force values of the two legs included in the actual force data of the two legs;

instructions for calculating a corresponding expanded length expected variation amount by performing an expanded length variation amount solving using a second elastic damping control model related to a leg longitudinal extension length that matches the actual leg support state based on the inter-leg support force difference and the inter-leg longitudinal force difference;

instructions for calculating a corresponding inter-leg horizontal position expected variation amount by performing a positional variation amount solving using a third elastic damping control model related to an inter-leg horizontal position difference that matches the actual leg support state based on the inter-leg horizontal force difference and an expected inter-leg horizontal internal force difference included in the step planning data of the two legs;

instructions for calculating an expected longitudinal position variation amount of the ankle joints of the two legs at the current moment based on the expanded length expected variation amount, and calculating an expected horizontal position variation amount of the ankle joints of the two legs based on the inter-leg horizontal position expected variation amount;

instructions for calculating an expected joint longitudinal position included in the desired joint position by performing a positional superimpose adjustment on a joint longitudinal planning position included in the step planning data of the two legs based on the expect longitudinal position variation amount of the ankle joints of the two legs at the current moment; and instructions for calculating an expected joint horizontal position included in the desired joint position by performing the positional superimpose adjustment on a joint horizontal planning position included in the step planning data of the two legs based on the expect horizontal position variation amount of the ankle joints of the two legs at the current moment.

13. The robot control apparatus of claim 12, wherein the second elastic damping control model is as an equation of:

$$\dot{u}_Z = K_{P2}(\Delta F_Z - \Delta F_{dZ}) - K_{S2}u_Z;$$

where, $\dot{u}_Z$ represents an expected change speed of the leg longitudinal extension length at the current moment, $u_Z$ represents an expected variation amount of the leg longitudinal extension length at the current moment, $\Delta F_Z$ represents the inter-leg support force difference, $\Delta F_{dZ}$ represents the inter-leg support force difference, $K_{P2}$ represents a second controller damping parameter vector for the leg longitudinal extension length at the current moment, and $K_{S2}$ represents a second controller stiffness parameter vector for the leg longitudinal extension length that matches the actual leg support state, where $\dot{u}_Z$ is the first derivative of $u_Z$, the actual leg support state is that the second controller stiffness parameter vector in a single-leg support state of the robot is larger than the second controller stiffness parameter when the actual leg support state is a two leg support state of the robot.

14. The robot control apparatus of claim 12, wherein the third elastic damping control model is as an equation of:

$$\dot{u}_L = K_{P3}(\Delta F_{dL} - \Delta F_L) - K_{S3}u_L;$$

where, $\dot{u}_L$ represents an expected change speed of an inter-leg horizontal position of the inter-leg horizontal position difference at the current moment, $u_L$ represents the inter-leg horizontal position expected variation amount of the inter-leg horizontal position difference at the current moment, $\Delta F_L$ represents the inter-leg horizontal force difference, $\Delta F_{dL}$ represents the expected inter-leg horizontal internal force difference, $K_{P3}$ represents a third controller damping parameter vector for the inter-leg horizontal position difference, and $K_{S3}$ represents a third controller stiffness parameter vector for the inter-leg horizontal position difference that matches the actual leg support state, where $\dot{u}_Z$ is the first derivative of $u_L$, the actual leg support state is that the third controller stiffness parameter vector in a single-leg support state of the robot is larger than the third controller stiffness parameter when the actual leg support state is a two leg support state of the robot.

15. A non-transitory computer-readable storage medium for storing one or more computer programs, wherein the one or more computer programs comprise:
   instructions for obtaining movement planning data of a centroid of a biped robot, step planning data of two legs of the biped robot and zero-moment point planning data of the biped robot at a current moment, and an actual leg support state, actual movement data of the centroid, actual position data of the two legs and actual force data of the two legs at the current moment;
   instructions for calculating an expected support force of the two legs based on the zero-moment point planning data and the actual position data of the two legs;
   instructions for calculating, using a compliance control algorithm, a desired joint posture angle of ankle joints of the two legs based on the expected support force of the two legs, the movement planning data of the centroid, the actual movement data of the centroid, and the actual force data of the two legs;
   instructions for calculating a desired joint position of the ankle joints of the two legs that matches the actual leg support state based on the expected support force of the two legs, the movement planning data of the centroid, the actual movement data of the centroid, and the actual force data of the two legs; and
   instructions for controlling the biped robot to perform a stepping motion according to the desired joint posture angle and the desired joint position of the ankle joints of the two legs;
   wherein the instructions for calculating the desired joint position of the ankle joints of the two legs that matches the actual leg support state based on the expected support force of the two legs, the movement planning data of the centroid, the actual movement data of the centroid, and the actual force data of the two legs comprise:
      instructions for calculating an inter-leg support force difference between the expected support forces of the two legs, and calculating an inter-leg longitudinal force difference between longitudinal actual force values of the two legs included in the actual force data of the two legs;
      instructions for calculating a corresponding expanded length expected variation amount by performing an expanded length variation amount solving using a second elastic damping control model related to a leg longitudinal extension length that matches the actual leg support state based on the inter-leg support force difference and the inter-leg longitudinal force difference;
      instructions for calculating a corresponding inter-leg horizontal position expected variation amount by performing a positional variation amount solving using a third elastic damping control model related to an inter-leg horizontal position difference that matches the actual leg support state based on the inter-leg horizontal force difference and an expected inter-leg horizontal internal force difference included in the step planning data of the two legs;
      instructions for calculating an expected longitudinal position variation amount of the ankle joints of the two legs at the current moment based on the expanded length expected variation amount, and calculating an expected horizontal position variation amount of the ankle joints of the two legs based on the inter-leg horizontal position expected variation amount;
      instructions for calculating an expected joint longitudinal position included in the desired joint position by performing a positional superimpose adjustment on a joint longitudinal planning position included in the step planning data of the two legs based on the expect longitudinal position variation amount of the ankle joints of the two legs at the current moment; and
      instructions for calculating an expected joint horizontal position included in the desired joint position by performing the positional superimpose adjustment on a joint horizontal planning position included in the step planning data of the two legs based on the expect horizontal position variation amount of the ankle joints of the two legs at the current moment.

16. The storage medium of claim 15, wherein the instructions for calculating the expected support force of the two legs based on the zero-moment point planning data and the actual position data of the two legs comprise:
   instructions for calculating a gravity sharing coefficient of each of the two legs of the biped robot based on a zero-moment point lateral planning position included in the zero-moment point planning data and an actual lateral position of each of the two legs of the biped robot included in the actual position data of the two legs; and instructions for calculating the expected support force of the two legs based on a mass of the biped robot and the gravity sharing coefficient of each of the two legs of the biped robot.

17. The storage medium of claim 15, wherein the instructions for calculating, using the compliance control algorithm, the desired joint posture angle of the ankle joints of the two legs based on the expected support force of the two legs, the movement planning data of the centroid, the actual movement data of the centroid, and the actual force data of the two legs comprise:

instructions for calculating a capture point planned horizontal position of the biped robot at the current moment based on a horizontal movement planning position of the centroid and a horizontal movement planning velocity of the centroid that are included in the movement planning data of the centroid;

instructions for calculating a capture point actual horizontal position of the biped robot at the current moment based on the actual horizontal movement position of the centroid and the actual horizontal movement velocity of the centroid that are included in the actual movement data of the centroid;

instructions for calculating a capture point position difference between the capture point planned horizontal position and the capture point actual horizontal position;

instructions for calculating an expected joint torque of the ankle joints of the two legs at the current moment by performing an ankle joint torque operation based on the expected support force of the two legs and the capture point position difference; and instructions for calculating the desired joint posture angle of the ankle joints of the two legs using a first elastic damping control model related to joint posture angle that corresponds to the ankle joints of the two legs based on the expected joint torque of the ankle joints of the two legs at the current moment and an actual joint torque of the ankle joints of the two legs included in the actual force data of the two legs at the current moment.

18. The storage medium of claim 17, wherein the first elastic damping control model is as an equation of:

$$\dot{R}=K_{P1}(T_d-T_m)-K_{S1}R;$$

where, $\dot{R}$ represents the expected angular velocity of any of the ankle joints of the two legs at the current moment, $T_d$ represents the desired joint posture angle of the ankle joints of the two legs at the current moment, $T_m$ represents the expected joint torque of the ankle joint of the leg at the current moment, $K_{P1}$ represents a first controller damping parameter vector for joint posture, and $K_{S1}$ represents a first controller stiffness parameter vector for joint posture, where $\dot{R}$ is the first derivative of R.

19. The storage medium of claim 15, wherein the second elastic damping control model is as an equation of:

$$\dot{u}Z=K_{P2}(\Delta F_Z-\Delta F_{dZ})-K_{S2}u_Z;$$

where, $\dot{u}_Z$ represents an expected change speed of the leg longitudinal extension length at the current moment, $u_Z$ represents an expected variation amount of the leg longitudinal extension length at the current moment, $\Delta F_Z$ represents the inter-leg support force difference, $\Delta F_{dZ}$ represents the inter-leg support force difference, $K_{P2}$ represents a second controller damping parameter vector for the leg longitudinal extension length at the current moment, and $K_{S2}$ represents a second controller stiffness parameter vector for the leg longitudinal extension length that matches the actual leg support state, where $\dot{u}_Z$ is the first derivative of $u_Z$, the actual leg support state is that the second controller stiffness parameter vector in a single-leg support state of the robot is larger than the second controller stiffness parameter when the actual leg support state is a two leg support state of the robot.

20. The storage medium of claim 15, wherein the third elastic damping control model is as an equation of:

$$\dot{u}_L=K_{P3}(\Delta F_{dL}-\Delta F_L)-K_{S3}u_L;$$

where, $\dot{u}_L$ represents an expected change speed of an inter-leg horizontal position of the inter-leg horizontal position difference at the current moment, $u_L$ represents the inter-leg horizontal position expected variation amount of the inter-leg horizontal position difference at the current moment, $\Delta F_L$ represents the inter-leg horizontal force difference, $\Delta F_{dL}$ represents the expected inter-leg horizontal internal force difference, $K_{P3}$ represents a third controller damping parameter vector for the inter-leg horizontal position difference, and $K_{S3}$ represents a third controller stiffness parameter vector for the inter-leg horizontal position difference that matches the actual leg support state, where $\dot{u}_L$ is the first derivative of $u_L$, the actual leg support state is that the third controller stiffness parameter vector in a single-leg support state of the robot is larger than the third controller stiffness parameter when the actual leg support state is a two leg support state of the robot.

* * * * *